United States Patent [19]

Ohe

[11] Patent Number: 5,181,659
[45] Date of Patent: Jan. 26, 1993

[54] SYNTHETIC RESIN SEAMLESS TUBE WITH BLACK PORTION(S) AND THROUGH-HOLES THEREIN

[75] Inventor: Tatsuta Ohe, Yamaguchi, Japan

[73] Assignee: Mitsui Petrochemical Industries, Ltd., Tokyo, Japan

[21] Appl. No.: 461,292

[22] Filed: Jan. 5, 1990

[30] Foreign Application Priority Data

Jan. 7, 1989 [JP] Japan .................................. 1-1876

[51] Int. Cl.$^5$ .............................................. B23K 26/00
[52] U.S. Cl. .................................. 239/556; 219/121.71
[58] Field of Search .......... 83/54; 219/121.64, 121.68, 219/121.70, 121.71; 239/566, 567, 547, 556, 548, 557

[56] References Cited

U.S. PATENT DOCUMENTS

| | | | |
|---|---|---|---|
| 3,293,652 | 12/1966 | Roshov | 219/121.7 X |
| 4,028,525 | 6/1977 | Mominee et al. | 219/121.70 |
| 4,181,051 | 1/1980 | Drori | 239/547 X |
| 4,857,696 | 8/1989 | Tueusch et al. | 219/121.71 X |

Primary Examiner—Andres Kashnikow
Assistant Examiner—Kevin Weldon
Attorney, Agent, or Firm—Sherman and Shalloway

[57] ABSTRACT

A tube having holes formed at precise positions is obtained by preparing a tube in which a substantially black synthetic resin film portion and a synthetic resin film portion substantially having a color other than black are formed alternately in its circumferential direction and then by drilling the black synthetic resin film portion by a laser beam.

5 Claims, 1 Drawing Sheet

SYNTHETIC RESIN SEAMLESS TUBE WITH BLACK PORTION(S) AND THROUGH-HOLES THEREIN

BACKGROUND OF THE INVENTION

The present invention relates to a tube having holes, and a method for manufacturing such a tube, more particularly, which is suitable for use in irrigation or sprinkling.

DESCRIPTION OF THE RELATED ART

Conventional tubes having holes have a large number of small holes formed in its longitudinal direction on a half side thereof. Such tubes having holes are widely used for sprinkling water or spraying liquid fertilizer over vegetables, fruits or flowers.

Manufacture of such a tube is not very difficult; it can be easily manufactured by forcing a synthetic resin through the cylindrical orifice of a die. However, drilling small holes only on one side of the continuous tube manufactured is not easy.

Conventionally, a tube having holes is manufactured by preparing a first synthetic resin tape with a large number of holes drilled in it and a second synthetic resin tape having the same shape but no holes in it and then by sticking the edges of the first tape to the edges of the second tape to form a continuous tube. The first tape is drilled mechanically by punching or using a laser beam.

However, the tube having holes manufactured in the above-described method has a disadvantage in that it may rupture at its seams when a hydraulic pressure is applied thereto. Furthermore, it is not easy to mass produce the above-described type of tube.

Accordingly, it has been proposed to drill a seamless tube manufactured by the extrusion by folding the seamless tube into two and then notching the folded edge of the tube in a semicircular form at predetermined intervals. The semicircular notches formed become circular holes when the seamless tube is unfolded. However, it is very difficult to notch the edge of the folded tube in the same semicircular form, and this makes it difficult for substantially circular holes to be formed in an unfolded tube, causing the areas of the openings of the individual holes to vary from each other.

SUMMARY OF THE INVENTION

In view of the aforementioned problems of the prior technique, an object of the present invention is to provide a tube with precise holes, and a method and an apparatus for manufacturing such a tube.

According to the present invention, there is provided a method of manufacturing a tube having holes which comprises the steps of molding a seamless tube in which a substantially black synthetic resin film portion and a synthetic resin film portion substantially having a color other than black are alternately formed in a circumferential direction of the tube, and drilling small holes in the substantially black synthetic resin film portion by a laser beam.

Thus, an obtained tube is a seamless tube made of a synthetic resin in which the substantially black synthetic resin film portion and the synthetic resin film portion substantially having a color other than black are alternately formed in a circumferential direction of the tube. This seamless tube has small through-holes drilled in the black synthetic resin film portion thereof.

From the viewpoint of drilling using a laser beam, it is preferable for a synthetic resin that forms the substantially black synthetic resin film portion to contain 0.5 to 10 wt. % of carbon black as a coloring agent.

DESCRIPTION OF THE PREFERRED EMBODIMENT

Figure 1:
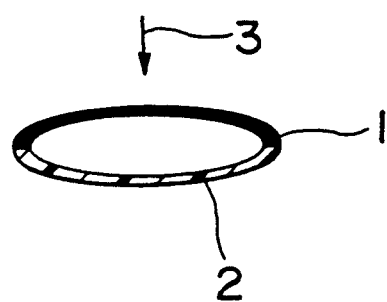
FIG. 1 is a cross-sectional view of a tube from which a tube having holes according to the present invention is manufactured.
Figure 2:
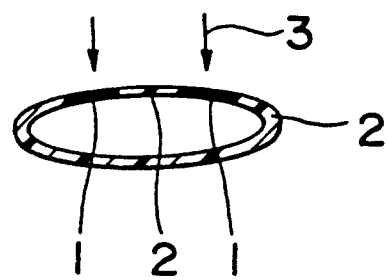
FIG. 2 is a cross-sectional view of another tube from which the tube having holes according to the present invention is manufactured.

A tube having holes and a method of manufacturing such a tube according to the present invention will be mainly described below with reference to FIGS. 1 and 2.

A tube having holes according to the present invention is a seamless tube in which a substantially black synthetic resin film portion and a synthetic resin film portion substantially having a color other than black are alternately formed in a circumferential direction of the tube.

The substantially black synthetic resin film portion and the synthetic resin film portion substantially having a color other than black may be formed of a thermoplastic resin. Suitable thermoplastic resins include polyolefines such as polyethylene, polyamide and polyester.

Both the black film portion and non-black film portion may be colored using coloring agents. Any known coloring agent may be used. Examples of coloring agents for the non-black film portion include titanium white, cyanine green, chrome yellow, cyanine blue and quinacridone red. No coloring may be performed on the non-black film portion.

However, it is preferable for the non-black film portion to be colored white or in a color as close to white as possible. Preferably, titanium white may be employed to color such a white film portion.

In a case where titanium white is used as a coloring agent, the coloring agent may be mixed in a ratio of 0.8 wt parts or above relative to 100 weight parts of synthetic resin.

The substantially black film portion may be colored using carbon black. Carbon black may be contained in a ratio ranging from 0.5 wt. % to 10 wt. %, and preferably, from 2 wt. % to 6 wt. %, relative to the overall weight of the synthetic resin compound containing carbon black.

If the ratio of carbon black is 0.5 wt. % or less relative to the overall weight of the synthetic resin compound that forms the black film portion, a laser beam absorption rate is low, making drilling difficult. If the ratio of carbon black exceeds 10 wt. %, the properties of the resultant film, such as tenacity or elongation thereof, are deteriorated.

When a tube is to be manufactured from a thermoplastic resin, two extruders and one tube molding die connected to the two extruders may be employed to mold the thermoplastic resin. More specifically, black molten resin containing carbon black in a ratio ranging from 0.5 wt. % to 10 wt. % may be forced out from one of the two extruders, whereas non-black molten resin may be forced out from the other extruder, the two molded resin portions being fitted with each other later by a tube molding die to form a seamless tube such as that shown in FIG. 1 in which a black portion and a non-black portion are alternately formed in its circumferential directions. The seamless tube may also be formed such that it has a plurality of black portions and a plurality of non-black portions alternately, as shown in FIG. 2.

In this invention, laser beam machining is performed on the tube obtained in the above-described manner by irradiating a laser beam on the black portion of the tube. Generally, a laser beam emitted from yttrium aluminum garnet crystals using neodymium ions may be employed. A laser beam may be output at 0.1 to 40 J/P, and preferably, at 0.3 to 2 J/P. If the output is less than 0.1 J/P, it is difficult to obtain an energy level sufficient to drill the tube. If the output exceeds 40 J/P, a laser beam may penetrate the tube, forming two holes in the tube or damaging the non-black portion, even if the tube employed is one in which two color portions are alternately formed.

When the laser beam irradiates the substantially black portion, most of the laser beam is absorbed by the dyestuff contained in the substantially black portion where it is converted into thermal energy, by means of which a hole is formed from the outer side of the tube toward the inner side thereof. After having passed through the hole, the laser beam proceeds further and reaches the inner side of the opposite side of the tube. However, since the opposite portion of the tube is substantially in a color other than black, most of the laser beam is irregularly reflected by that portion while the remaining portion of optical energy is converted into thermal energy, thus preventing a hole from being formed from the inner side of the tube toward the outer side thereof. This enables the tube to be drilled in a flat state by a laser beam.

An example of the method of manufacturing a tube having holes will be described below with reference to FIGS. 1 to 2.

EXAMPLE

A tube having holes was manufactured by the manufacturing method in the manner described below.

A tube molding die and two extruders connected to this tube molding die were employed. 96 weight parts of transparent pellet of polyethylene and 4 weight parts of carbon black were put in one of the extruders where they were kneaded. 98 weight parts of transparent pellet of polyethylene and 2 weight parts of titanium white were put in the other extruder where they were kneaded. The two molded resin portions extruded from the respective extruders were fitted with each other by the tube molding die so as to form a seamless tube in which a black synthetic resin film portion 1 and a white synthetic resin film portion 2 were formed, as shown in FIG. 1.

Next, the black portion 1 of the thus-obtained tube was irradiated by a YAG laser beam 3 for drilling. The laser beam 3 was output at 0.8 J/P.

An accurate hole was formed in the tube at a precise position.

No damage was made on the white portion 2 of the tube by the laser beam 3.

In the method of manufacturing a tube having holes according to the present invention, the tube prepared can be drilled using a laser beam, facilitating drilling. Furthermore, since the tube can be drilled by a laser beam in a flat state, the precise holes can be formed in the tube at precise positions. The resultant tube has no fitted portion and, hence, there is no decrease in the strength thereof. These eliminate provision of defected tube having holes.

What is claimed is:

1. A seamless tube having holes, said tube being made of a synthetic resin, said tube comprising a substantially black synthetic resin portion and a substantially white synthetic resin portion alternately spaced about the tube's circumference, and said substantially black synthetic resin portion has small through holes.

2. The seamless tube of claim 1 wherein said substantially white portion is colored with titanium white.

3. The seamless tube of claim 1 wherein the substantially black synthetic resin portion comprises from about 0.5 to 10 wt. % of carbon black.

4. The seamless tube of claim 1 wherein the substantially black synthetic resin portion comprises from about 2 to 6 wt. % of carbon black.

5. The seamless tube of claim 1 which comprises a plurality of said substantially black synthetic resin portions and said substantially white synthetic resin portions alternating about the tube's circumference.

* * * * *

UNITED STATES PATENT AND TRADEMARK OFFICE
CERTIFICATE OF CORRECTION

PATENT NO. : 5,181,659

DATED : Jan. 26, 1993

INVENTOR(S) : TATSUYA OHE

It is certified that error appears in the above-identified patent and that said Letters Patent is hereby corrected as shown below:

ON THE TITLE PAGE:

At [75] Inventor: "Tatsuta Ohe" should read --Tatsuya Ohe--.

Signed and Sealed this

Twenty-third Day of November, 1993

Attest:

BRUCE LEHMAN

*Attesting Officer*  *Commissioner of Patents and Trademarks*